US008107613B2

(12) United States Patent
Gumbula

(10) Patent No.: US 8,107,613 B2
(45) Date of Patent: Jan. 31, 2012

(54) CONTEXT RECOVERY FOR CALL CENTER AGENTS

(75) Inventor: Srinivasa R. Gumbula, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1348 days.

(21) Appl. No.: 11/690,209

(22) Filed: Mar. 23, 2007

(65) Prior Publication Data
US 2008/0232575 A1    Sep. 25, 2008

(51) Int. Cl.
*H04M 3/00* (2006.01)
*H04M 5/00* (2006.01)

(52) U.S. Cl. ......... 379/265.11; 379/265.12; 379/265.13; 379/266.01

(58) Field of Classification Search .................. 709/219, 709/217; 455/414.1, 412.1, 466; 370/353; 379/265, 266, 263, 264
See application file for complete search history.

(56) References Cited

U.S. PATENT DOCUMENTS

| | | | | |
|---|---|---|---|---|
| 6,249,570 | B1 * | 6/2001 | Glowny et al. | 379/88.22 |
| 6,741,697 | B2 * | 5/2004 | Benson et al. | 379/265.02 |
| 6,959,078 | B1 * | 10/2005 | Eilbacher et al. | 379/265.03 |
| 7,382,773 | B2 * | 6/2008 | Schoeneberger et al. | 370/353 |
| 2001/0024497 | A1 * | 9/2001 | Campbell et al. | 379/265.09 |
| 2002/0035616 | A1 * | 3/2002 | Diamond et al. | 709/219 |
| 2002/0106071 | A1 * | 8/2002 | Uppaluru et al. | 379/265.02 |
| 2002/0150232 | A1 * | 10/2002 | Walker et al. | 379/266.01 |
| 2003/0147522 | A1 * | 8/2003 | Elazar | 379/265.06 |
| 2004/0136518 | A1 | 7/2004 | Slato et al. | |
| 2004/0203660 | A1 * | 10/2004 | Tibrewal et al. | 455/414.1 |
| 2005/0141694 | A1 * | 6/2005 | Wengrovitz | 379/265.09 |
| 2005/0147228 | A1 * | 7/2005 | Perrella et al. | 379/265.06 |
| 2005/0286708 | A1 | 12/2005 | Slosberg et al. | |
| 2006/0058049 | A1 * | 3/2006 | McLaughlin et al. | 455/466 |
| 2006/0245579 | A1 * | 11/2006 | Bienfait et al. | 379/265.02 |
| 2006/0262920 | A1 * | 11/2006 | Conway et al. | 379/265.02 |
| 2006/0262921 | A1 * | 11/2006 | Eppel et al. | 379/265.02 |
| 2007/0041527 | A1 * | 2/2007 | Tuchman et al. | 379/88.22 |
| 2007/0160188 | A1 * | 7/2007 | Sharpe et al. | 379/265.01 |
| 2007/0206767 | A1 * | 9/2007 | Keren et al. | 379/265.01 |
| 2008/0037764 | A1 * | 2/2008 | Lee et al. | 379/266.01 |
| 2008/0152122 | A1 * | 6/2008 | Idan et al. | 379/265.07 |
| 2008/0175374 | A1 * | 7/2008 | Lauridsen et al. | 379/266.1 |

FOREIGN PATENT DOCUMENTS

JP    2002-077412    3/2002

* cited by examiner

*Primary Examiner* — Ahmad Matar
*Assistant Examiner* — Kharye Pope
(74) *Attorney, Agent, or Firm* — Chapin IP Law, LLC; David W. Rouille, Esq.

(57) ABSTRACT

A call center processes calls in such a way that a caller's matter is first handled by a first agent and is subsequently handled by a second agent. The call center creates a voice recording of at least part of that portion of the caller's matter handled by the first agent. Subsequently, the second agent is given an opportunity to play back the voice recording prior to the second agent handling the caller's matter. In this way, the caller is not required to repeat the same information to both the first and second agents.

18 Claims, 3 Drawing Sheets

*FIG. 3*

Customer Interaction Record 300

Customer Name: John Doe
Address: 123 Main Street
New York, NY 12345  } 310
Phone Number: (212)123-4567

Purchase Record: Mega Router 2/28/05
Ultra Modem 11/25/06  } 320
Super Modem 1/16/07

Previous Interactions:

| DATE | TIME | AGENT | ISSUE |
|---|---|---|---|
| 12/1/07 | 10:14 AM | ABC | Modem will not connect – attempt to repair unsuccessful – return authorized |
| Today | 1:21 PM | DEF | Caller needs help formatting hard drive |

} 330

```
CALL FORWARDED FROM AGENT DEF AT 1:25 PM
     INITIAL CONTACT RECORDING AVAILABLE
```
} 340

CONTEXT RECOVERY FOR CALL CENTER AGENTS

FIELD OF THE INVENTION

The present invention relates generally to call centers, and, more particularly, to processing calls in call centers wherein a caller's matter is handled by more than one agent.

BACKGROUND OF THE INVENTION

Call centers are frequently operated by companies to administer incoming product support and information inquiries from consumers. Companies that use call centers may include, for example, utility companies, mail order catalog companies, and computer hardware and software companies. A call center distributes calls and other types of communications to available agents in accordance with various predetermined criteria. The criteria for handling a call are often programmable by the operator of the system via a capability known as call vectoring. Typically, when a call center system detects that an agent has become available to handle a call, the system delivers to that agent the longest-waiting call. Once an agent receives a call, the agent usually is required to populate a computerized record of the interaction. This computerized record will often include fields such as the contact information of the caller, the time and duration of the call, the agent handling the call, the matter presented, and any activities directed at resolving the matter. In other words, the computerized record will act as written history of the communications between a given caller and the call center.

A given call to a call center is frequently handled by more than one agent. Call center agents are often organized into a multi-tier system to facilitate the efficient handling of calls. The lower tier typically consists of agents who are able to handle most matters with a given caller. However, if the caller requires more assistance, the caller is forwarded to one or more higher tiers of support, typically staffed by managers, or, in the case of technical matters, by more highly skilled support staff such as product engineers and developers. Calls to call centers are also sometimes dropped because of technical glitches in either the call center system itself or in the communication system used to direct the incoming calls to the call center. Because of the number of agents working at a given call center at any one time, a caller who calls back after being dropped is likely to be directed to an agent different from the one that the caller initially spoke with before being dropped.

Because of both the forwarding of calls and the dropping of calls, an agent (a "subsequent agent") must frequently handle a caller who has already spoken with a different agent (an "original agent"). In coming up to speed on the caller's matter, the subsequent agent may, to some extent, rely on any entries made in the caller's computerized record by the original agent, but, more often than not, must make the caller repeat all or some of the information that the caller already communicated to the original agent. This is especially true when the matter is complicated or of a technical nature, and the original agent is not equipped to adequately record the matter in the caller's computerized record. This repeating of information may be an inefficient use of the subsequent agent's time, and, perhaps more importantly, may be frustrating to the caller who is required to communicate the same information more than once.

As a result, there is a need for a means of efficiently handling a caller's matter using more than one agent without requiring that the caller repeat the same information.

SUMMARY OF THE INVENTION

Embodiments of the present invention address the above-identified need by providing methods and apparatus allowing a call center to efficiently handle a caller's matter using more than one agent without requiring the caller to repeat the same information to the different agents.

In accordance with an aspect of the invention, a call center processes calls in such a way that a caller's matter is first handled by a first agent and is subsequently handled by a second agent. The call center creates a voice recording of at least part of that portion of the caller's matter handled by the first agent. Subsequently, the second agent is given an opportunity to play back the voice recording prior to the second agent handling the caller's matter.

In accordance with one of the above-identified embodiments of the invention, a call center comprises a voice transaction recording (VTR) system. The VTR system records voice calls between agents and callers to the call center. If a caller's matter is first handled by a first agent and subsequently handled by a second agent, the voice recording of the interaction between the caller and the first agent is made available to the second agent before the second agent begins to handle the caller's matter. The second agent uses the voice recording to come up to speed on why the caller placed the call to the call center. In this way, the caller's matter may be handled by multiple agents without requiring that the caller repeat information to agents. Caller frustration is thereby mitigated.

These and other features and advantages of the present invention will become apparent from the following detailed description which is to be read in conjunction with the accompanying drawings.

BRIEF DESCRIPTION OF THE DRAWINGS

FIG. 3 shows an illustrative customer interaction record in the FIG. 1 call center.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Although the invention will be illustrated below in conjunction with the processing of calls in an exemplary call center, it is not limited to use with any particular type of call center or communication processing application. For example, the invention is applicable to the processing of incoming communications, outgoing communications, or both. The disclosed techniques can be used with automatic call distribution (ACD) systems, telemarketing systems, private-branch exchange (PBX) systems, computer-telephony integration (CTI)-based systems, as well as in combinations of these and other types of call centers. The term "call center"

as used herein is thus intended to include any type of ACD system, telemarketing system, or other communication system which processes voice calls, including voice calls that are associated with other types of media such as video and voice calls that are transmitted using the Voice over Internet Protocol (VoIP).

Figure 1:
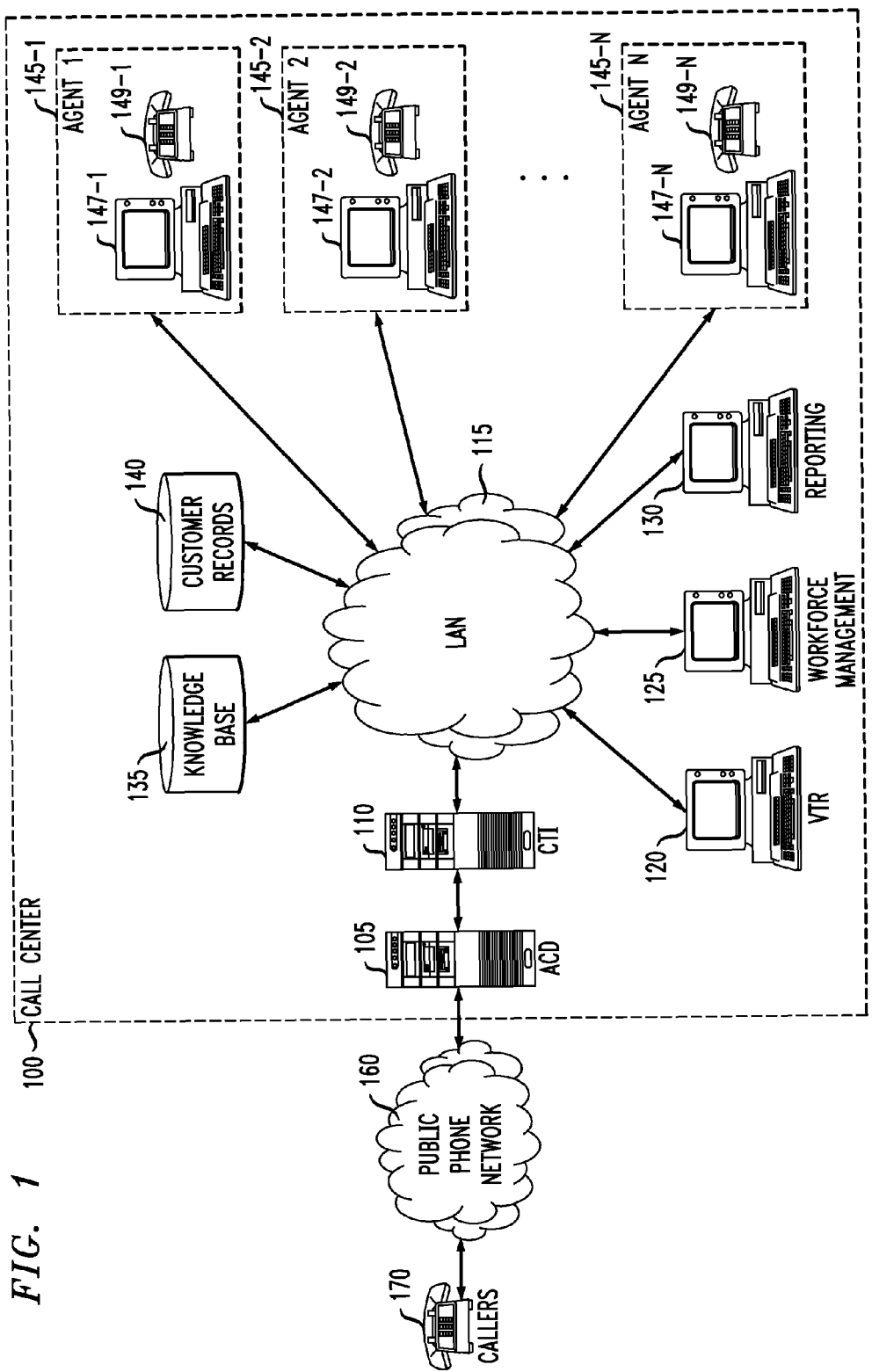
FIG. 1 shows a block diagram of a call center in accordance with an illustrative embodiment of the invention.

FIG. 1 shows a block diagram of an illustrative call center 100 in accordance with an illustrative embodiment of the invention. For purposes of illustrating aspects of the invention, it will be assumed that the call center is associated with a company that sells computer hardware and that the call center is tasked with providing technical support to purchasers of that hardware. The call center comprises various systems and databases. While these systems and databases are described as discrete elements within the illustrative call center, one skilled in the art will recognize that several of the systems and databases are likely to be combined or integrated when implemented in actual hardware and software. An ACD system 105 is in communication with a CTI system 110. The CTI system is linked to a local area network (LAN) 115 which, in turn, is in communication with a VTR system 120, a workforce management system 125, a reporting system 130, a knowledge base 135, and a customer records database 140. Also in communication with the LAN are N agents, 145-$i$, where i=1, 2, . . . N. Each agent has access to a workstation 147-$i$ and a telephone 149-$i$. The call center is linked to a public phone network 160 which acts to route calls from callers 170 into the ACD system of the call center.

Certain elements of the call center 100 are largely conventional and will, as a result, be familiar to one skilled in the art. These elements may be implemented in whole or in part using one or more elements of an otherwise conventional call center processing system, such as the DEFINITY® system commercially available from Avaya Inc. of Basking Ridge, N.J., USA. The characteristics, functions, and features of such systems are well known in the art and will therefore not be described in great detail herein.

Briefly, the ACD system 105 routes the incoming calls received from the public phone network 160 to the pool of agents 145-$i$. Routing is based on a rule-based set of instructions that tells the ACD system how calls are to be handled. The ACD system may be configured, for example, to simply queue incoming calls based on the order in which they are received, and to direct the calls to agents in the order of the queue as agents become available. As a variation on routing based solely on queues, the ACD system may also be configured to route calls to agents based on skills ("skills-based routing"). Skills-based routing is used to match each caller's needs with the agent who has the best skill set to service those needs. An interactive voice response (IVR) capability within the ACD system may be used to determine caller needs.

The CTI system 110 acts to integrate and coordinate the computer-based systems of the call center with the call center's telephone systems. More specifically, the CTI system gives the agents 145-$i$ the ability to control their respective telephones 149-$i$ using their respective workstations 147-$i$. The CTI system also allows the agents to access and, in some cases, modify the data in the knowledge base 135 and in the customer records database 140. Data stored in the knowledge base includes scripts for handling callers' matters and problem-solving guidelines, policies, and procedures. Data stored in the customer records database, in contrast, includes records of callers' interactions with the company and the call center. In the present embodiment, the CTI system is programmed to cause a particular set of data from the customer records database to "pop-up" on an agent's workstation when that agent handles a call, as will be described in greater detail below.

The VTR system 120 acts to record voice transactions between the callers 170 and the agents 145-$i$, and to make these voice recordings available for playback. The voice calls are preferably saved on a storage medium within the VTR system (e.g., hard drive, electronic memory, CD, DVD, etc.), but alternative storage locations may be utilized such as the customer records database 140. The VTR system may save the voice recordings in one of several digital audio file formats including, but not limited to, the commonly used Waveform Audio Format (WAV), Audio Interchange File Format (AIFF), and the Au File Format (AU). Such voice recordings are conventionally used in call centers to verify the accuracy of information entered by an agent, correct errors to the entered data, prevent and deter agent and caller fraud, monitor agent performance and demeanor, train agents, and defend the call center against claims or legal actions brought by callers.

Finally, the workforce management system 125 and the reporting system 130 allow the call center's management to modify the dynamics of the call center 100 as workforce resources change, to assess the performance of the call center, and to report the results of these assessments. For example, these systems may allow the managers to generate agent performance reports that provide statistics on the performance of each agent 145-$i$. Such reports may include how long an agent took to service calls, how many calls were answered, and the amount of time the agent was available to handle calls. The workforce management system and the reporting system may also be capable of generating reports on the performance of the ACD system indicating, for example, how many callers called, how fast the calls were answered, how many callers hung up, and how long it took to handle the average call.

As mentioned earlier, in a typical call center, a caller's matter is frequently handled by more than one agent. This may occur as a result of one agent forwarding a call to a different agent, such as in the case where an agent in a lower tier forwards a call to a more suitable agent in a higher tier. More than one agent may also handle a caller's matter when the caller's initial call is dropped and the caller telephones the call center back.

Figure 2:
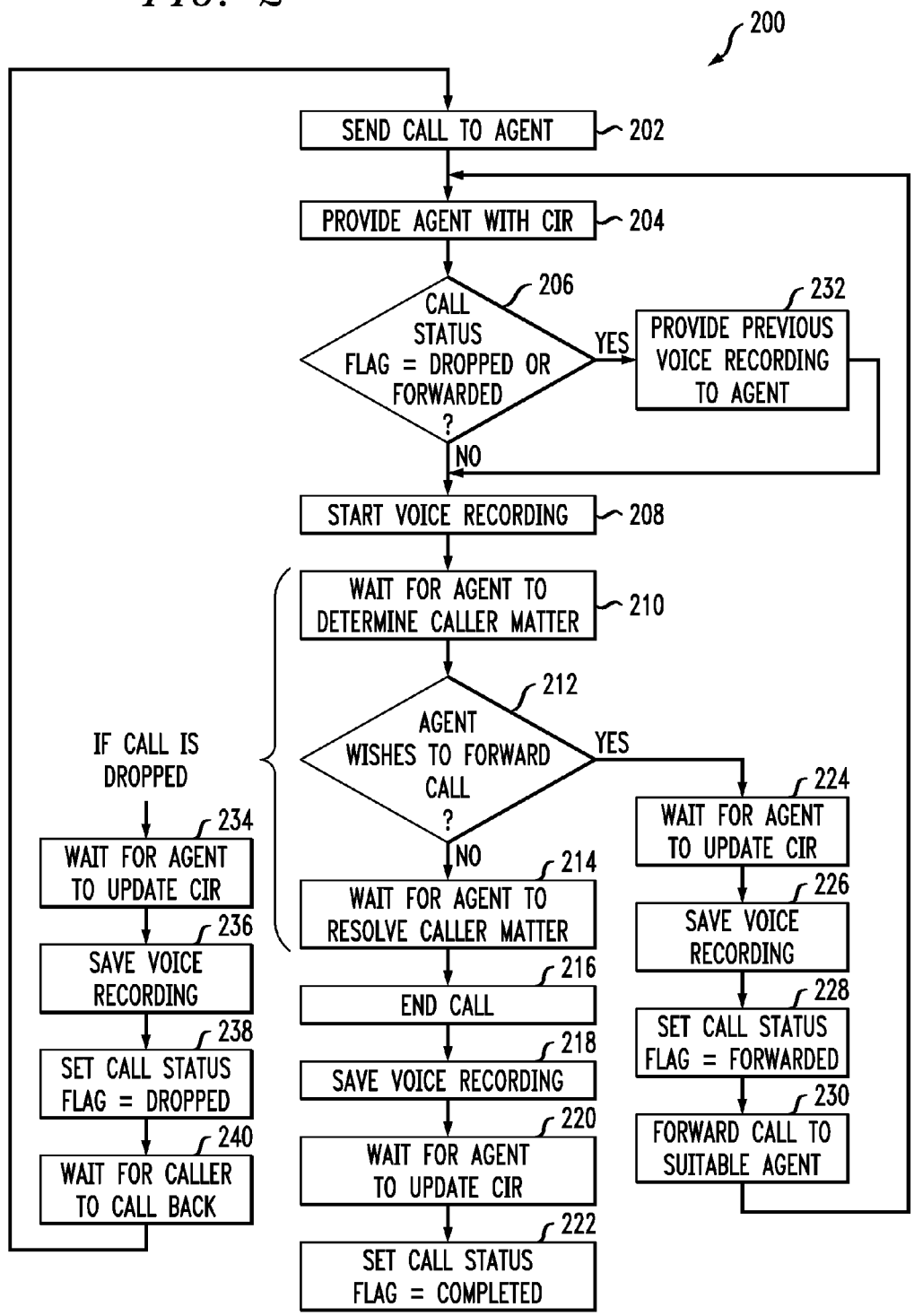
FIG. 2 shows a flow diagram of an illustrative method of implementing aspects of the invention in the FIG. 1 call center.

FIG. 2 shows a flow diagram of an illustrative method of implementing aspects of the invention using the above-described call center 100. The method includes steps 202-240, each of which will be described in the following discussion. In step 202, a call is received by the call center from a particular caller among the callers 170 (also referred to as the "connected caller" 170') and, after being processed by the ACD system 105, is forwarded to a particular agent among the agents 145-$i$ (also referred to as the "original handling agent" 145' having workstation 147' and telephone 149') via the CTI system 110 and LAN 115. In addition to connecting the original handling agent's telephone 149' to the connected caller, the CTI system in step 204 also retrieves data about the connected caller from the customer records database 140 and displays this data on the original handling agent's workstation 147'. Optionally, the CTI system may identify the connected caller by using a form of automatic number identification (ANI), often referred to as "caller ID."

In this particular illustrative embodiment, data about the connected caller 170' is displayed to the original handling agent 145' in the form of a "customer interaction record" (CIR). The CIR provides information about the connected caller that may be helpful to an agent in resolving the connected caller's matter. The original handling agent is also expected to update the CIR to reflect matters handled in the present call. An exemplary CIR 300 is shown in FIG. 3. Field 310 shows the connected caller's name, address, and telephone number. In addition, field 320 shows the items (e.g., computer hardware) purchased by the connected caller and the dates of purchase. Field 320 may also, optionally, show the status of any warranties on the items purchased as well as agent-selectable links to information in the knowledge base 135 concerning the particular items that are displayed. Field 330 shows records of the previous interactions that the connected caller has had with the call center 100, more specifically, the date and time of the calls, the initials of the agents handling the calls, and the issues handled and their resolution. Finally, field 340 indicates the availability of an "initial contact recording," which is described in greater detail below. Of course, the particular data shown in the CIR in FIG. 3 is merely illustrative and, in actual application, may be modified to better suit the purposes and requirements of a particular call center. These modifications will be apparent to one skilled in the art and will still come within the scope of the invention.

Referring again to the flow diagram of FIG. 2, in decision step 206, the content of a data flag referred to as a "call status flag" is checked and a decision is made based on its content. The call status flag preferably comprises a plurality of bits of data and is stored in the customer records database 140 as part of a connected caller's CIR data. The call status flag can take on various states, including NULL, FORWARDED, DROPPED, and COMPLETED. If no value has been expressly assigned to a call status flag, it defaults to the NULL state.

At this point in the description of the method 200, it will be assumed that the call status flag for the connected caller 170' is in the NULL state. As a result, the method progresses to step 208. In step 208, the VTR system 120 begins to digitally record the call between the connected caller and the original handling agent 145'. Optionally, the CTI system may cause a prerecorded voice recording to be automatically played for the connected caller before allowing the VTR system to begin recording. The prerecorded voice recording may notify the connected caller that the call may be recorded. This notice may be required for various legal reasons.

In step 210, the CTI system 110 waits for the original handling agent 145' to determine the connected caller's matter (e.g., why the connected caller 170' is calling). After determining the connected caller's matter, the original handling agent is given an opportunity to forward the call to a different agent (a subsequent handling agent) in decision step 212 if the original handling agent believes that the connected caller's matter warrants such an action. The original handling agent is preferably able to forward the call by entering a command on the agent's workstation 147'. If the original handling agent decides that forwarding is unnecessary, the method 200 proceeds to step 214 where the CTI system waits for the original handling agent to resolve the connected caller's matter. After resolving the matter, the original handling agent indicates that status to the CTI system by entering another command on the agent's workstation. At this point, the CTI system ends the call between the connected caller and the original handling agent in step 216.

Before allowing the original handling agent 145' to receive another call, several further steps are preferably completed with regard to the just-ended call. In step 218, the VTR system 120 saves the voice recording for the just-ended call, digitally annotating the voice recording data with an indication of the connected caller 170' as well as the date and time the recording was made. This allows the content of the particular call to be readily accessed at a later time by managers or other agents when, for example, performing quality control tasks. Then, in step 220, the CTI system 110 waits for the original handling agent to modify the relevant CIR to reflect what transpired in the just-ended call. Such mandatory data entry is advantageous because it forces the original handling agent to make entries in the CIR while the content of the call is fresh in the agent's memory and before the agent moves on to a different call. If necessary, the original handling agent may optionally direct the VTR system 120 to play back all or some of the voice recording for the just-ended call in order to enter the new CIR data accurately. In step 222, the call status flag for the connected caller is set to COMPLETED and the original handling agent is made available to receive the next call.

As indicated in FIG. 2, various branches are taken in the method 200 if a call is forwarded or dropped. As described earlier, the decision step 212 allows the original handling agent 145' to forward a call to a different agent (also referred to as the "subsequent handling agent" 145" having workstation 147" and telephone 149") if the original handling agent believes the caller's matter would be best handled by the different agent. After the original handling agent indicates this decision by entering a forwarding command on the agent's workstation 147' in decision step 212, the CTI system 110 waits for the original handling agent to update the connected caller's CIR in step 224 with a description of whatever transpired between the connected caller and the original handling agent up to that point in time. In step 226, the VTR system 120 saves the voice recording between the connected caller 170' and the original handling agent, again with an annotation of the connected caller as well as the date and time that the recording was made. In step 228, the call status flag is set to FORWARDED. Finally, in step 230, the CTI system directs the call to the appropriate subsequent handling agent.

The subsequent handling agent 145" then begins to handle the call at step 204. In step 204, the subsequent handling agent is provided with the CIR for the connected caller 170'. Next, in decision step 206, the call status flag for the connected caller is examined. Because the call was forwarded, the call status flag now is set to FORWARDED, causing the method 200 to advance to step 232.

Step 232 comprises having the CTI system 110 and the VTR system 120 provide the subsequent handling agent 145" with the voice recording of the interaction between the connected caller 170' and the original handling agent 145' (also referred to as the "previous voice recording"). The VTR system may easily determine which stored voice recording is to be provided by determining which stored voice recording for the connected caller has date and time annotations closest to the present date and time. Advantageously, this ability to listen to the previous voice recording gives the subsequent handling agent the opportunity to come up to speed with the connected caller's matter (e.g., determine the context of the connected caller's matter) before beginning to handle the matter with the connected caller directly. In this way, the subsequent handling agent is able to begin handling the connected caller's matter without requiring that the connected caller repeat information that was provided to the original handling agent. Caller frustration in this regard is thereby mitigated.

To help in making the subsequent handling agent 145" aware that the previous voice recording is available from the VTR system 120, the CTI system 110 preferably indicates the availability of the previous voice recording on the connected caller's CIR data when it is displayed for the subsequent handling agent. Like the VTR system, the CTI system would be triggered to make such an indication because the call status flag is set to FORWARDED. Such an indication on the CIR may, for example, appear like field 340 shown in FIG. 3. Here, a block of data shows that a call was forwarded, the time of forwarding, the initials of the original handling agent, and that an "initial contact recording" is available for playback by the subsequent handling agent. The subsequent handling may also be provided with a selectable icon (e.g., an icon that may be clicked using a pointing device) or other manner of indicating to the CTI and VTR systems that the agent wishes to begin listening to the previous voice recording. Of course, the exact manner in which the availability of the previous voice recording is indicated to a subsequent handling agent may vary. Alternatively or optionally, for example, the subsequent handling agent may be given an audible indication that the previous voice recording is available for playback.

As indicated above, the playback of the previous voice recording may be something that the subsequent handling agent 145" chooses to do by selecting an icon or making some other input to the agent's workstation 147" upon being notified that the previous voice recording exists. Rather than the giving the subsequent handling agent the choice whether to listen to the previous voice recording, however, the playback may be made mandatory by configuring the CTI system 110 to not allow the subsequent handling agent to begin communicating with the connected caller 170 until the previous voice recording is played back in whole or in part. As another alternative, the subsequent handling agent may be required to listen to the entire previous voice recording if the duration of the voice recording is less than a predetermined time (e.g., 2 minutes). If the previous voice recording is longer than the predetermined time, the subsequent handling agent may be required to listen to the previous voice recording for the predetermined time before being allowed to stop listening to the voice recording and to begin interacting with the connected caller directly. Any one of these configuration would come within the scope of the invention.

The connected caller 170' may optionally be placed on hold during the period that the subsequent handling agent 145" is listening to the previous voice recording. If the caller is placed on hold, it is preferable that the CTI system 110 play a prerecorded voice message to the connected caller to indicate what activities are occurring while the connected caller is waiting. Such a prerecorded voice message may indicate, for example, that a new agent is listening to what has already transpired and is preparing to handle the connected caller's matter. This may put the connected caller at ease during the wait. Alternatively or additionally, music or advertising messages may be played to the connected caller.

Once the subsequent handling agent 145" begins to handle the connected caller's matter directly, the method 200 progresses to step 208 and continues in accordance with FIG. 2. Like the original handling agent 145', the subsequent handling agent, too, will have an opportunity to forward the call. If this is done, the agent that handles the call after the subsequent handling agent will have an opportunity to listen to a voice recording between the connected caller and the subsequent handling agent before beginning to handle the call.

Because dropped calls are likely to be handled by more than one agent 145-i, they are handled in a manner similar to that of forwarded calls. During steps 210-214, the CTI system monitors 110 the call to see if it is dropped. If a particular call is dropped, the method 200 immediately moves to step 234 for that call and the agent handling the call is required to enter any relevant data in the dropped caller's CIR. In step 236, the voice recording of the dropped call is saved by the VTR system 120. Subsequently, in step 238, the call status flag is set to DROPPED for the dropped caller in the customer records database 140. Finally, at step 240, the call center waits for the dropped caller to call back.

When the dropped caller 170' calls back, the caller is directed to a different agent 145-i (now, a subsequent handling agent) in step 202. As was the case for forwarded calls, the subsequent handling agent is provided with the previous voice recording of the dropped call in step 232 so that the agent can come up to speed with dropped caller's matter.

It should again be emphasized that the above-described embodiments of the invention are intended to be illustrative only. Other embodiments can use different system elements and method steps for implementing the described functionality. These numerous alternative embodiments within the scope of the following claims will be apparent to one skilled in the art.

What is claimed is:

1. A method of processing calls in a call center wherein a caller's matter is first handled by a first agent and is subsequently handled by a second agent, the method comprising the steps of: upon receipt of an incoming communication, creating a voice recording of at least part of that portion of the caller's matter handled by the first agent;
   providing the second agent with an opportunity to play back the voice recording prior to the second agent handling said caller's matter, said caller being temporarily placed on hold if the second agent plays back the voice recording;
   upon a subsequent handling of the call by the second agent, receiving, by the second agent an indication of the voice recording; connecting the second agent to said caller on hold following the second agent listening to at least a portion of the voice recording; playing a recorded message to said caller while said caller is temporarily on hold, the recorded message comprising an indication that the second agent is playing back the voice recording;
   designating the call as a transferred call prior to transfer to the second agent; prior to transferring the call to the second agent, waiting for the first agent to update an interaction record with a description of the content of the call between the first agent and said caller;
   receiving, from the first agent, the interaction record prior to permitting the first agent to move onto another call or permitting the second agent to respond to said caller; and during playing of the recorded message, providing an opportunity for the second agent to review the voice recording and the interaction record while said caller continues receiving the recorded message.

2. The method of claim 1, wherein the second agent is required to play back the entire voice recording before handling the caller's matter.

3. The method of claim 1, wherein the second agent is required to playback the entire voice recording before handling the caller's matter if the voice recording does not exceed a predetermined duration.

4. The method of claim 1, further comprising the step of flagging data associated with the caller between the steps of creating the voice recording and providing the second agent with the opportunity to play back the voice recording, the flag indicating that the voice recording is available for playback by the second agent.

5. The method of claim 1, further comprising the step of forwarding the caller from the first agent to the second agent between the steps of creating the voice recording and providing the second agent with the opportunity to play back the voice recording.

6. The method of claim 1, wherein the voice recording is saved in a digital form with an indication of a date and a time the voice recording was created.

7. The method of claim 1, further comprising the step of creating a second voice recording of at least part of that portion of the caller's matter handled by the second agent.

8. The method of claim 1, further comprising the step of providing the second agent with a visual indication that the voice recording is available for playback.

9. The method of claim 8, wherein the visual indication is provided to the second agent on a computer monitor associated with the second agent.

10. The method of claim 1, further comprising the step of providing the second agent with an audible indication that the voice recording is available for playback.

11. An apparatus for processing calls in a call center wherein a caller's matter is first handled by a first agent and is subsequently handled by a second agent, the apparatus comprising a processor-based voice recorder operative to record at least part of that portion of said caller's matter handled by the first agent;

and to provide the second agent with an opportunity to play back the voice recording prior to the second agent handling said caller's matter, the apparatus further operable to: indicate to the second agent to the existence of the voice recording;

to place said caller temporarily on hold if the second agent plays back the voice recording, the telephone interface further configured to play a recorded message to said caller while said caller is temporarily on hold, the recorded message comprising an indication that the second agent is playing back the voice recording;

to connect the second agent to said caller on hold following the second agent listening to at least a portion of the voice recording; designate the call as a transferred call prior to transfer to the second agent; prior to transferring the call to the second agent, wait for the first agent to update an interaction record with a description of the content of the call between the first agent and said caller;

to receive, from the first agent, the interaction record prior to permitting the first agent to move onto another call or permitting the second agent to respond to said caller; and during playing of the recorded message, provide an opportunity for the second agent to review the voice recording and the interaction record while said caller continues receiving the recorded message.

12. The apparatus of claim 11, wherein the apparatus is at least partially implemented in a computer-telephony integration system.

13. The apparatus of claim 11, wherein the apparatus is at least partially implemented in a voice transaction recording system.

14. A call center wherein a caller's matter is first handled by a first agent and is subsequently handled by a second agent, the call center comprising: a network; a plurality of agent terminals connected to the network;

a processor connected to the network, the processor operative to record at least part of that portion of said caller's matter handled by the first agent and to provide the second agent with an opportunity to play back the voice recording prior to the second agent handling said the caller's matter;

a memory connected to the network, the memory operative to store the voice recording; an indicator to alert the second agent to the existence of the voice recording; a telephony interface for placing said caller temporarily on hold if the second agent plays back the voice recording, the telephone interface further configured to play a recorded message to said caller while said caller is temporarily on hold, the recorded message comprising an indication that the second agent is playing back the voice recording;

the telephone interface connecting the second agent to said caller on hold following the second agent listening to at least a portion of the voice recording the telephony interface further configured to: designate the call as a transferred call prior to transfer to the second agent: prior to transferring the call to the second agent, wait for the first agent to update an interaction record with a description of the content of the call between the first agent and said caller;

receive, from the first agent, the interaction record prior to permitting the first agent to move onto another call or permitting the second agent to respond to said caller; and during playing of the recorded message, provide an opportunity for the second agent to review the voice recording and the interaction record while said caller continues receiving the recorded message.

15. The call center of claim 14, wherein the call center further comprises an automatic call distribution system.

16. The call center of claim 14, wherein the processor is implemented in at least one of a computer-telephony integration system and a voice transaction recording system.

17. The method of claim 1, further comprising the second agent being required to listen to the previous voice recording for at least a predetermined period prior to interacting with the caller on hold.

18. The method of claim 1 further comprising updating a call status flag, the call status flag including states of null, forwarded, dropped and completed; and marking the call status flag as completed with respect to the fist agent following entering a customer interaction record (CIR) containing the interaction record.

* * * * *